United States Patent
Ju et al.

(10) Patent No.: US 9,580,555 B2
(45) Date of Patent: Feb. 28, 2017

(54) TRANSPARENT POLYAMIDE-IMIDE RESIN AND FILM USING SAME

(71) Applicant: KOLON INDUSTRIES, INC., Gwacheon-si, Gyeonggi-do (KR)

(72) Inventors: Chul Ha Ju, Yongin-si (KR); Hyo Jun Park, Yongin-si (KR); Hak Gee Jung, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/107,634

(22) PCT Filed: Dec. 26, 2014

(86) PCT No.: PCT/KR2014/012882
§ 371 (c)(1),
(2) Date: Jun. 23, 2016

(87) PCT Pub. No.: WO2015/099478
PCT Pub. Date: Jul. 2, 2015

(65) Prior Publication Data
US 2016/0319076 A1    Nov. 3, 2016

(30) Foreign Application Priority Data

Dec. 26, 2013 (KR) .......... 10-2013-0164009
Dec. 24, 2014 (KR) .......... 10-2014-0188216

(51) Int. Cl.
C08G 73/00 (2006.01)
C08G 79/08 (2006.01)
C08G 73/14 (2006.01)
C08J 5/18 (2006.01)
C08L 79/08 (2006.01)

(52) U.S. Cl.
CPC ............ C08G 73/14 (2013.01); C08J 5/18 (2013.01); C08L 79/08 (2013.01); *C08J 2379/08* (2013.01)

(58) Field of Classification Search
None
See application file for complete search history.

(56) References Cited

FOREIGN PATENT DOCUMENTS

| | | | |
|---|---|---|---|
| CN | 103282414 A | | 9/2013 |
| KR | 1020130071650 | * | 7/2013 |
| KR | 10-2013-0110589 A | | 10/2013 |
| KR | 2013/170135 A1 | | 4/2015 |
| TW | 201313785 A1 | | 4/2013 |
| TW | I472556 B | | 2/2015 |
| WO | 2012/144563 A1 | | 10/2012 |

OTHER PUBLICATIONS

Machine translation of KR 1020130071650.*
International Search Report; Communication issued by the International Searching Authority in corresponding International application No. PCT/KR2014/012882, on Apr. 9, 2015.
Taiwanese Intellectual Property Office; Communication dated Jun. 30, 2016 in counterpart Application No. 103145580.
Jang et al., "The optical and dielectric characterization of light-colored fluorinated polyimides based on 1,3-bis(4-amino-2-trifluoromethylphenoxy)benzene", Materials Chemistry and Physics, 2007, vol. 104, pp. 342-349.

* cited by examiner

*Primary Examiner* — Ana Woodward
(74) *Attorney, Agent, or Firm* — Sughrue Mion, PLLC

(57) ABSTRACT

Disclosed are a transparent polyamide-imide resin and a film using the same, which can be colorless and transparent, can show excellent thermal stability and mechanical properties, and can have low birefringence, making it possible to serve in various fields including a semiconductor insulator, a TFT-LCD insulator, a passivation layer, a liquid crystal alignment layer, materials for optical communication, a protective film for a solar cell, a flexible display substrate and the like.

12 Claims, No Drawings

TRANSPARENT POLYAMIDE-IMIDE RESIN AND FILM USING SAME

CROSS REFERENCE TO RELATED APPLICATIONS

This application is a National Stage of International Application No. PCT/KR2014/012882 filed Dec. 26, 2014, claiming priority based on Korean Patent Application Nos. 10-2013-0164009 filed on Dec. 26, 2013 and 10-2014-0188216 filed on Dec. 24, 2014, the contents of all of which are incorporated herein by reference in their entirety.

TECHNICAL FIELD

The present invention relates to a transparent polyamide-imide resin and a film using the same and, more particularly, to a transparent polyamide-imide resin and a film using the same, which may exhibit superior thermal stability and mechanical properties and low birefringence, making it possible to serve as a substrate for a plastic display.

BACKGROUND ART

Generally, a polyimide film is formed from a polyimide resin. Such a polyimide resin is a highly heat-resistant resin prepared by subjecting an aromatic dianhydride and an aromatic diamine or an aromatic diisocyanate to solution polymerization, thus preparing a polyamic acid derivative, which is then subjected to a ring-closing reaction and dehydration at a high temperature so as to be imidized.

In the preparation of the polyimide resin, examples of the aromatic dianhydride may include pyromellitic dianhydride (PMDA), biphenyltetracarboxylic dianhydride (BPDA), etc., and examples of the aromatic diamine may include oxydianiline (ODA), p-phenylenediamine (p-PDA), m-phenylenediamine (m-PDA), methylenedianiline (MDA), bisaminophenylhexafluoropropane (HFDA), etc.

Since a polyimide resin is a very strongly heat-resistant resin, which is insoluble and infusible, and is superior in terms of thermal oxidation resistance, heat resistance, radiation resistance, low-temperature characteristics, chemical resistance and the like, it has been utilized in a variety of fields including those of advanced heat-resistant materials, such as automotive materials, aircraft materials, spacecraft materials, etc., and electronic materials such as insulation coating materials, insulating films, semiconductors, electrode protective films for TFT-LCDs, etc.

However, a polyimide resin is brown- or yellow-colored, attributable to its high aromatic ring density, and thus has low transmittance in the visible light range, and also, is unsuitable for use in an optical member due to the high birefringence thereof.

In order to impart transparency to a polyimide having a deep brown and yellow color, a linkage group (—O—, —SO$_2$—, —CO—, —CF$_3$CCF$_3$—) or a side chain having a relatively large free volume is introduced to the main chain, thus minimizing the formation of an intermolecular or intramolecular charge transfer complex, whereby transparency may be realized.

However, such a transparent polyimide film may have decreased heat resistance due to the introduced functional group. This is considered to be due to the charge transfer complex, and the film becomes transparent but its heat resistance is decreased. When heat resistance is decreased in this way, the transparent polyimide film is difficult to apply to advanced material fields including displays or semiconductors, which require high processing temperatures. To solve this problem, attempts have been made to polymerize monomers in the solvent after purification, but without any significant increase in transmittance.

U.S. Pat. No. 5,053,480 discloses the use of an alicyclic dianhydride component instead of an aromatic dianhydride. The formation of a solution or a film is improved in transparency and color compared to the purification method, but the increase in transmittance is limited and thus unsatisfactory transmittance results. Also, the thermal and mechanical properties are deteriorated.

U.S. Pat. Nos. 4,595,548, 4,603,061, 4,645,824, 4,895,972, 5,218,083, 5,093,453, 5,218,077, 5,367,046, 5,338,826, 5,986,036, and 6,232,428, and Korean Patent Application Publication No. 2003-0009437 disclose the preparation of a novel polyimide having improved transmittance and color transparency in the range within which thermal properties are not significantly deteriorated using a linkage group such as —O—, —SO$_2$—, CH$_2$—, etc., a monomer having a bent structure connected to an m-position rather than a p-position, or aromatic dianhydride and aromatic diamine monomers having a substituent such as —CF$_3$, etc. However, the above polyimide has high birefringence.

Meanwhile, a conventional glass substrate is difficult to realize flexible properties and may be easily broken, making it difficult to use in real-world applications. To manufacture a thin lightweight substrate, a conventional glass substrate is coated with a polyimide material, after which the glass is separated, or it is formed on a polyimide film, in addition to the use of the thin glass substrate. When a colorless transparent polyimide film is applied to display fields, it may be utilized for display devices having various shapes, may exhibit flexible properties, and is thin, lightweight and unbreakable.

Therefore, a transparent polyimide, which is to be applied to display processes, needs superior thermal stability that may endure display processing, high mechanical properties for preventing the breakage thereof, and low birefringence to ensure a desired viewing angle.

DISCLOSURE

Technical Problem

Accordingly, the present invention is intended to provide a transparent polyamide-imide resin and a film using the same, which are suitable for use in a substrate for a plastic display owing to superior thermal stability and mechanical properties and low birefringence thereof.

In addition, the present invention is intended to provide a substrate for a plastic display, which has increased thermal stability and mechanical properties and low birefringence.

Technical Solution

An embodiment of the present invention provides a polyamide-imide resin, which is an imide of a polyamic acid resulting from copolymerizing an aromatic dianhydride and an aromatic dicarbonyl compound with an aromatic diamine, wherein the aromatic dicarbonyl compound is contained in an amount of 1 to 50 mol % based on the total molar amount of the aromatic dianhydride and the aromatic dicarbonyl compound, the aromatic dianhydride includes (i) 4,4'-hexafluoroisopropylidene diphthalic anhydride (6FDA) and (ii) at least one selected from among cyclobutanetetracarboxylic dianhydride (CBDA) and cyclopentanetetracarboxylic dianhydride (CPDA), and the aromatic diamine includes 2,2'-bis(trifluoromethyl)-1,1'-biphenyl-4,4'-diamine (TFDB).

In a preferred embodiment of the present invention, the aromatic dicarbonyl compound may include at least one selected from the group consisting of p-terephthaloyl chloride (TPC), terephthalic acid, iso-phthaloyl dichloride, and 4,4'-benzoyl chloride.

In a preferred embodiment of the present invention, the (ii) at least one selected from among the cyclobutanetetracarboxylic dianhydride (CBDA) and the cyclopentanetetracarboxylic dianhydride (CPDA) may be contained in an amount of 10 to 30 mol % based on the total molar amount of the aromatic dianhydride and the aromatic dicarbonyl compound.

In a preferred embodiment of the present invention, the aromatic diamine may further include at least one selected from the group consisting of oxydianiline (ODA), p-phenylenediamine (pPDA), m-phenylenediamine (mPDA), bis(aminohydroxyphenyl)hexafluoropropane (DBOH), bis(aminophenoxy)benzene (133APB, 134APB, 144APB), bis(aminophenyl)hexafluoropropane (33-6F, 44-6F), bis(aminophenyl)sulfone (4DDS, 3DDS), bis[(aminophenoxy)phenyl]hexafluoropropane (4BDAF), bis[(aminophenoxy)phenyl]propane (6HMDA), and bis(aminophenoxy)diphenylsulfone (DBSDA).

In a preferred embodiment of the present invention, the aromatic dianhydride may further include at least one selected from the group consisting of biphenyltetracarboxylic dianhydride (BPDA), bicyclo[2.2.2]oct-7-ene-2,3,5,6-tetracarboxylic dianhydride (BTA), 4-(2,5-dioxotetrahydrofuran-3-yl)-1,2,3,4-tetrahydronaphthalene-1,2-dicarboxylic dianhydride (TDA), pyromellitic dianhydride, 1,2,4,5-benzenetetracarboxylic dianhydride (PMDA), benzophenone tetracarboxylic dianhydride (BTDA), bis(carboxyphenyl) dimethylsilane dianhydride (SiDA), oxydiphthalic dianhydride (ODPA), bis(dicarboxyphenoxy) diphenylsulfide dianhydride (BDSDA), sulfonyl diphthalic anhydride (SO2DPA), and (isopropylidenediphenoxy)bis(phthalic anhydride) (6HDBA).

Another embodiment of the present invention provides a polyamide-imide film, manufactured from the above polyamide-imide resin.

In a preferred embodiment of the present invention, the polyamide-imide film may have a transmittance of 88% or more, measured at 550 nm, for a film having a thickness of 8 to 12 μm, and a coefficient of thermal expansion (CTE) of 13 ppm/° C. or less, measured at 50 to 300° C. using a thermomechanical analysis method (TMA method).

In a preferred embodiment of the present invention, the polyamide-imide film may have a tensile strength of 130 MPa or more for a film having a thickness of 8 to 12 μm when measured according to ASTM D882.

In a preferred embodiment of the present invention, the polyamide-imide film may have a birefringence of 0.1 or less, an in-plane retardation (Ro) of 1 nm or less, and a thickness-direction retardation (Rth) of 300 nm or less at a thickness of 10 μm.

Still another embodiment of the present invention provides a substrate for a plastic display including the above polyamide-imide film.

Advantageous Effects

According to the present invention, a polyamide-imide resin and a film using the same are colorless and transparent, show excellent thermal stability and mechanical properties, and have low birefringence, making them suitable for use in various fields including a semiconductor insulator, a TFT-LCD insulator, a passivation layer, a liquid crystal alignment layer, materials for optical communication, a protective film for a solar cell, a flexible display substrate and the like.

BEST MODE

Unless otherwise defined, all the technical and scientific terms used herein have the same meanings as those typically understood by those skilled in the art to which the present invention belongs. Generally, the nomenclature used herein is well known in the art and is typical.

As used herein, when any part "includes" any element, this means that another element is not excluded but may be further included unless otherwise specifically mentioned.

In the foregoing and following description, the term "imidization" is defined to include "amidization", and the term "imide" is defined to include "amide".

An aspect of the present invention pertains to a polyamide-imide resin, which is an imide of a polyamic acid resulting from copolymerizing an aromatic dianhydride and an aromatic dicarbonyl compound with an aromatic diamine. In the preparation of the polyamic acid, the aromatic dianhydride includes (i) 4,4'-hexafluoroisopropylidene diphthalic anhydride (6FDA) and (ii) at least one selected from among cyclobutanetetracarboxylic dianhydride (CBDA) and cyclopentanetetracarboxylic dianhydride (CPDA), and the aromatic diamine includes 2,2'-bis(trifluoromethyl)-1,1'-biphenyl-4,4'-diamine (TFDB).

Another aspect of the present invention pertains to a polyamide-imide film made of the polyamide-imide resin and a substrate for a plastic display including the polyamide-imide film.

Hereinafter, a detailed description will be given of the present invention.

The present invention addresses a polyamide-imide resin and a film using the same, which are suitable for use in a substrate for a plastic display owing to superior thermal stability and mechanical properties and low birefringence thereof. The polyamide-imide resin is an imide of a polyamic acid resulting from copolymerizing an aromatic dianhydride, an aromatic dicarbonyl compound and an aromatic diamine, and a film using the same may be provided. As such, the aromatic dianhydride includes (i) 4,4'-hexafluoroisopropylidene diphthalic anhydride (6FDA) and (ii) at least one selected from among cyclobutanetetracarboxylic dianhydride (CBDA) and cyclopentanetetracarboxylic dianhydride (CPDA), and the aromatic diamine includes 2,2'-bis(trifluoromethyl)-1,1'-biphenyl-4,4'-diamine (TFDB).

The aromatic dicarbonyl compound may include at least one selected from the group consisting of p-terephthaloyl chloride (TPC), terephthalic acid, iso-phthaloyl dichloride, and 4,4'-benzoyl chloride.

The aromatic dicarbonyl compound has a benzene ring and may thus exhibit high thermal stability and mechanical properties, but has high birefringence due thereto. Also, the cycloaliphatic dianhydride, such as cyclobutanetetracarboxylic dianhydride (CBDA), cyclopentanetetracarboxylic dianhydride (CPDA) and the like, has low birefringence but may deteriorate thermal stability and mechanical properties.

However, when 2,2'-bis(trifluoromethyl)-1,1'-biphenyl-4,4'-diamine (TFDB) is used as the diamine, thermal stability and optical properties may increase. Also, when the aromatic dianhydride, the aromatic dicarbonyl compound and the aromatic diamine are copolymerized in amounts controlled within specific ranges, the thermal stability, mechanical properties and optical properties may be improved and thus balanced.

In the present invention, the aromatic diamine may further include an additional aromatic diamine, in addition to bis-trifluoromethyl benzidine (TFDB), in the interest of thermal stability and birefringence, and the additional aromatic diamine may include, but is not limited to, at least one selected from the group consisting of oxydianiline (ODA), p-phenylenediamine (pPDA), m-phenylenediamine (mPDA), bis(aminohydroxyphenyl)hexafluoropropane (DBOH), bis(aminophenoxy)benzene (133APB, 134APB, 144APB), bis(aminophenyl)hexafluoropropane (33-6F, 44-6F), bis(aminophenyl)sulfone (ODDS, 3DDS), bis[(aminophenoxy)phenyl]hexafluoropropane (4BDAF), bis[(aminophenoxy)phenyl]propane (6HMDA), and bis(aminophenoxy)diphenylsulfone (DBSDA).

In the present invention, the aromatic dianhydride may further include an additional aromatic dianhydride, in addition to 4,4'-hexafluoroisopropylidene diphthalic anhydride (6FDA) and at least one selected from among cyclobutanetetracarboxylic dianhydride (CBDA) and cyclopentanetetracarboxylic dianhydride (CPDA), in the interest of thermal stability, mechanical properties and optical properties, and the additional aromatic dianhydride may include, but is not limited to, at least one selected from the group consisting of biphenyltetracarboxylic dianhydride (BPDA), bicyclo[2.2.2]oct-7-ene-2,3,5,6-tetracarboxylic dianhydride (BTA), 4-(2,5-dioxotetrahydrofuran-3-yl)-1,2,3,4-tetrahydronaphthalene-1,2-dicarboxylic dianhydride (TDA), pyromellitic dianhydride, 1,2,4,5-benzenetetracarboxylic dianhydride (PMDA), benzophenone tetracarboxylic dianhydride (BTDA), bis(carboxyphenyl) dimethylsilane dianhydride (SiDA), oxydiphthalic dianhydride (ODPA), bis(dicarboxyphenoxy) diphenylsulfide dianhydride (BDSDA), sulfonyl diphthalic dianhydride (SO2DPA), and (isopropylidenediphenoxy)bis(phthalic anhydride) (6HDBA).

The polyamide-imide resin according to the present invention is obtained by polymerizing an aromatic diamine with an aromatic dianhydride and an aromatic dicarbonyl compound, followed by imidization. In order to attain desired thermal stability, mechanical properties and birefringence, the aromatic dianhydride and the aromatic dicarbonyl compound are copolymerized with the diamine at an equivalent ratio of 1:1, thus preparing a polyamic acid solution. The polymerization conditions are not particularly limited, but polymerization is preferably performed at −10 to 80° C. for 2 to 48 hr in an inert atmosphere.

In the present invention, a solvent may be used for solution polymerization of the monomers, and is not particularly limited so long as it dissolves polyamic acid, and preferably includes at least one polar solvent selected from among m-cresol, N-methyl-2-pyrrolidone (NMP), dimethylformamide (DMF), dimethylacetamide (DMAc), dimethylsulfoxide (DMSO), acetone, and diethyl acetate. In addition thereto, a low-boiling-point solvent, such as tetrahydrofuran (THF) or chloroform, or a solvent characterized by low absorption, such as γ-butyrolactone, may be utilized.

The amount of the solvent is not particularly limited, but is preferably 50 to 95 wt %, and more preferably 70 to 90 wt %, based on the total amount of the polyamic acid solution, in order to obtain a polyamic acid solution having appropriate molecular weight and viscosity.

Since the amount of the aromatic dicarbonyl compound that is added for the reaction may affect the thermal stability, mechanical properties and birefringence of the resin and film, the aromatic dicarbonyl compound is added in an amount of 1 to 50 mol %, and preferably 5 to 50 mol %, based on the total molar amount of the aromatic dianhydride and the aromatic dicarbonyl compound so as not to deteriorate the inherent properties of the corresponding polyamide-imide.

If the amount of the aromatic dicarbonyl compound exceeds mol % based on the total molar amount of the aromatic dianhydride and the aromatic dicarbonyl compound, the thermal stability and mechanical properties may increase but the optical properties, such as a yellow index or transmittance, may decrease. In particular, the birefringence value may increase, making it difficult to use the resulting film as a display substrate.

On the other hand, if the amount of the aromatic dicarbonyl compound is less than 1 mol % based on the total molar amount of the aromatic dianhydride and the aromatic dicarbonyl compound, the optical properties may increase but the thermal stability and mechanical properties may decrease, and thus twisting and breakage may occur in the display fabrication process.

Of the aromatic dianhydride, (ii) at least one selected from among cyclobutanetetracarboxylic dianhydride (CBDA) and cyclopentanetetracarboxylic dianhydride (CPDA) is used in an amount of 10 to 30 mol % based on the total molar amount of the aromatic dianhydride and the aromatic dicarbonyl compound, thereby uniformly improving optical properties in the intended wavelength range and uniformly increasing thermal stability and mechanical properties.

The polyamic acid solution thus obtained is imidized to yield a polyamide-imide resin. The useful imidization method may be appropriately selected from among known imidization processes, examples of which include thermal imidization, chemical imidization, or a combination of thermal imidization and chemical imidization.

The polyamide-imide film may be obtained by casting the polyamic acid on a support and then performing the above imidization process.

Specifically, chemical imidization is performed by adding the polyamic acid solution with a dehydrating agent including an acid anhydride such as acetic anhydride, etc., and an imidization catalyst including a tertiary amine such as isoquinoline, β-picoline, pyridine, etc. Also, thermal imidization or a combination of thermal imidization and chemical imidization may be controlled or varied depending on the kind of polyamic acid solution, the thickness of the resulting polyamide-imide film, etc.

More specifically, the polyamide-imide film is manufactured using a combination of thermal imidization and chemical imidization in a manner in which the polyamic acid solution is added with a dehydrating agent and an imidization catalyst, cast on a support, heated at 80 to 200° C., and preferably 100 to 180° C., to activate the dehydrating agent and the imidization catalyst, partially cured and dried, and then heated at 200 to 400° C. for 5 to 400 sec, thereby obtaining a polyamide-imide film.

Alternatively, the polyamide-imide film may be manufactured from the polyamic acid solution as follows. Specifically, the polyamic acid solution is imidized, after which the imidized solution is added to the second solvent, precipitated, filtered and dried, thus obtaining a polyamide-imide resin solid, which is then dissolved in the first solvent to prepare a polyamide-imide solution, following by a film-forming process, resulting in a desired film.

When the polyamic acid solution is imidized, the imidization process, such as thermal imidization, chemical imidization, or a combination of thermal imidization and chemical imidization as mentioned above, may be performed. In the imidization process through a combination of thermal imidization and chemical imidization, the obtained polyamic acid solution is added with a dehydrating agent and an imidization catalyst and heated at 20 to 180° C. for 1 to 12 hr and thus imidized.

The first solvent may be the same as the solvent used upon polymerization of the polyamic acid solution, and the second solvent may be a solvent having lower polarity than the first solvent in order to attain the polyamide-imide resin solid. Specific examples of the second solvent may include at least one selected from among water, alcohols, ethers, and ketones. The amount of the second solvent is not particularly limited, and is preferably 5 to 20 times the weight of the polyamic acid solution.

The polyamide-imide resin solid thus obtained is filtered and is then preferably dried at 50 to 120° C. for 3 to 24 hr taking into consideration the boiling point of the second solvent.

In the film-forming process, the polyamide-imide solution, in which the polyamide-imide resin solid is dissolved, is cast on the support, and then heated for 1 min to 8 hr while the temperature thereof is gradually increased in the range from 40 to 400° C., yielding a polyamide-imide film.

In the present invention, the polyamide-imide film thus obtained is heat treated once more so as to remove thermal hysteresis and residual stress from the film, thus ensuring stable thermal properties of the film. This additional heat treatment is carried out at 300 to 500° C. for 1 min to 3 hr, and the film after heat treatment has a residual volatile content of 5% or less, and preferably 3% or less.

According to the present invention, the obtained polyamide-imide resin has a weight average molecular weight of 150,000 to 180,000, a viscosity of 700 to 900 poise, and a glass transition temperature of 300° C. or higher.

Also, the polyamide-imide film according to the present invention has a transmittance of 88% or more, measured at 550 nm for a film having a thickness of 8 to 12 μm, a yellow index of 5 or less, and a coefficient of thermal expansion (CTE) of ppm/° C. or less, measured at 50 to 300° C. using a thermomechanical analysis method (TMA method).

Also, the polyamide-imide film according to the present invention has a tensile strength of 130 MPa or more for a film having a thickness of 8 to 12 μm upon measurement based on ASTM D882, a birefringence of 0.1 or less, an in-plane retardation (Ro) of 1 nm or less, and a thickness-direction retardation (Rth) of 300 nm or less at a thickness of 10 μm.

As mentioned above, the polyamide-imide film according to the present invention is colorless and transparent, shows excellent thermal stability and mechanical properties, and has low birefringence, and can thus be useful in various fields including a semiconductor insulator, a TFT-LCD insulator, a passivation layer, a liquid crystal alignment layer, materials for optical communication, a protective film for a solar cell, a flexible display substrate and the like.

MODE FOR INVENTION

A better understanding of the present invention may be obtained through the following examples, which are set forth to illustrate, but are not to be construed to limit the scope of the present invention.

Example 1

While nitrogen was passed through a 1 L reactor equipped with a stirrer, a nitrogen injector, a dropping funnel, a temperature controller and a condenser, 716 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 23.99 g (0.054 mol) of 6FDA and 7.06 g (0.036 mol) of CBDA were added and then stirred for a predetermined period of time and thus dissolved and allowed to react. The temperature of the solution was then maintained at 15° C., after which 18.27 g (0.09 mol) of TPC was added and allowed to react at 25° C. for 12 hr, thus obtaining a polyamic acid solution having a solid content of 13 wt % and a viscosity of 860 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 95 g of a polyamide-imide copolymer in solid powder form.

The polyamide-imide solid powder was found to have an average particle size of 70 to 80 μm through particle size measurement, and a weight average molecular weight of 174,000 through molecular weight measurement.

In the foregoing and following description, the average particle size of the polyamide-imide solid powder was determined by measuring the particle size thereof three times using a particle size analyzer (S3500, Microtrac) and then averaging them. The precipitated solid was dried and the resulting copolymer powder was used as an analytical sample, and the weight average molecular weight was measured by drying the precipitated solid to obtain a copolymer powder which was then dissolved at a concentration of about 1% in N,N-dimethylacetamide (DMAc), filtered via a 0.45 μm PTFE syringe filter, injected, and then subjected to GPC (Gel Permeation Chromatography).

95 g of the polyamide-imide copolymer in solid powder form was dissolved in 768 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining a 10 μm thick polyamide-imide film, which was then subjected to final heat treatment at 300° C. for 10 min.

Example 2

While nitrogen was passed through a 1 L reactor equipped with a stirrer, a nitrogen injector, a dropping funnel, a temperature controller and a condenser, 744 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 31.99 g (0.072 mol) of 6FDA and 7.06 g (0.036 mol) of CBDA were added and then stirred for a predetermined period of time and thus dissolved and allowed to react. The temperature of the solution was then maintained at 15° C., after which 14.62 g (0.072 mol) of TPC was added and allowed to react at 25° C. for 12 hr, thus obtaining a polyamic acid solution having a solid content of 13 wt % and a viscosity of 830 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100°

C. for 6 hr in a vacuum, yielding 104 g of a polyamide-imide copolymer in solid powder form.

The polyamide-imide solid powder was found to have an average particle size of 70 to 80 μm through particle size measurement and a weight average molecular weight of 163,000 through molecular weight measurement.

104 g of the polyamide-imide copolymer in solid powder form was dissolved in 841 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining a 10 μm thick polyamide-imide film, which was then subjected to final heat treatment at 300° C. for 10 min.

Example 3

While nitrogen was passed through a 1 L reactor equipped with a stirrer, a nitrogen injector, a dropping funnel, a temperature controller and a condenser, 803 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 47.98 g (0.108 mol) of 6FDA and 7.06 g (0.036 mol) of CBDA were added and stirred for a predetermined period of time and thus dissolved and allowed to react. The temperature of the solution was then maintained at 15° C., after which 7.31 g (0.036 mol) of TPC was added and allowed to react at 25° C. for 12 hr, thus obtaining a polyamic acid solution having a solid content of 13 wt % and a viscosity of 815 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 110 g of a polyamide-imide copolymer in solid powder form.

The polyamide-imide solid powder was found to have an average particle size of 70 to 80 μm through particle size measurement and a weight average molecular weight of 157,000 through molecular weight measurement.

110 g of the polyamide-imide copolymer in solid powder form was dissolved in 890 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining an 11 μm thick polyamide-imide film, which was then subjected to final heat treatment at 300° C. for 10 min.

Example 4

While nitrogen was passed through a 1 L reactor equipped with a stirrer, a nitrogen injector, a dropping funnel, a temperature controller and a condenser, 846 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 59.97 g (0.135 mol) of 6FDA and 7.06 g (0.036 mol) of CBDA were added and stirred for a predetermined period of time and thus dissolved and allowed to react. The temperature of the solution was then maintained at 15° C., after which 1.83 g (0.009 mol) of TPC was added and allowed to react at 25° C. for 12 hr, thus obtaining a polyamic acid solution having a solid content of 13 wt % and a viscosity of 840 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 114 g of a polyamide-imide copolymer in solid powder form.

The polyamide-imide solid powder was found to have an average particle size of 70 to 80 μm through particle size measurement and a weight average molecular weight of 172,000 through molecular weight measurement.

114 g of the polyamide-imide copolymer in solid powder form was dissolved in 922 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining an 11 μm thick polyamide-imide film, which was then subjected to final heat treatment at 300° C. for 10 min.

Example 5

While nitrogen was passed through a 1 L reactor equipped with a stirrer, a nitrogen injector, a dropping funnel, a temperature controller and a condenser, 719 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 23.99 g (0.054 mol) of 6FDA and 7.57 g (0.036 mol) of CPDA were added and stirred for a predetermined period of time and thus dissolved and allowed to react. The temperature of the solution was then maintained at 15° C., after which 18.27 g (0.09 mol) of TPC was added and allowed to react at 25° C. for 12 hr, thus obtaining a polyamic acid solution having a solid content of 13 wt % and a viscosity of 790 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 90 g of a polyamide-imide copolymer in solid powder form.

The polyamide-imide solid powder was found to have an average particle size of 70 to 80 μm through particle size measurement and a weight average molecular weight of 151,000 through molecular weight measurement.

90 g of the polyamide-imide copolymer in solid powder form was dissolved in 728 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining an 11 μm thick polyamide-imide film, which was then subjected to final heat treatment at 300° C. for 10 min.

The polyamide-imide film thus obtained was measured to determine the coefficient of linear thermal expansion at 50 to 300° C. using a TMA method. As a result, the coefficient of linear thermal expansion thereof was found to be 10.2 ppm/° C.

Example 6

While nitrogen was passed through a 1 L reactor equipped with a stirrer, a nitrogen injector, a dropping funnel, a temperature controller and a condenser, 764 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 31.99 g (0.072 mol) of 6FDA and 7.57 g (0.036 mol) of CPDA were added and stirred for a predetermined period of time and thus dissolved and allowed to react. The temperature of the solution was then maintained at 15° C., after which 14.62 g (0.072 mol) of TPC was added and allowed to react at 25° C. for 12 hr, thus obtaining a polyamic acid solution having a solid content of 13 wt % and a viscosity of 780 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 102 g of a polyamide-imide copolymer in solid powder form.

The polyamide-imide solid powder was found to have an average particle size of 70 to 80 μm through particle size measurement and a weight average molecular weight of 150,000 through molecular weight measurement.

102 g of the polyamide-imide copolymer in solid powder form was dissolved in 825 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining a 12 μm thick polyamide-imide film, which was then subjected to final heat treatment at 300° C. for 10 min.

Example 7

While nitrogen was passed through a 1 L reactor equipped with a stirrer, a nitrogen injector, a dropping funnel, a temperature controller and a condenser, 806 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 47.98 g (0.108 mol) of 6FDA and 7.57 g (0.036 mol) of CPDA were added and stirred for a predetermined period of time and thus dissolved and allowed to react. The temperature of the solution was then maintained at 15° C., after which 7.31 g (0.036 mol) of TPC was added and allowed to react at 25° C. for 12 hr, thus obtaining a polyamic acid solution having a solid content of 13 wt % and a viscosity of 790 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 109 g of a polyamide-imide copolymer in solid powder form.

The polyamide-imide solid powder was found to have an average particle size of 70 to 80 μm through particle size measurement and a weight average molecular weight of 151,000 through molecular weight measurement.

109 g of the polyamide-imide copolymer in solid powder form was dissolved in 882 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining a 10 μm thick polyamide-imide film, which was then subjected to final heat treatment at 300° C. for 10 min.

Example 8

While nitrogen was passed through a 1 L reactor equipped with a stirrer, a nitrogen injector, a dropping funnel, a temperature controller and a condenser, 849 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 59.97 g (0.135 mol) of 6FDA and 7.57 g (0.036 mol) of CPDA were added and stirred for a predetermined period of time and thus dissolved and allowed to react. The temperature of the solution was then maintained at 15° C., after which 1.83 g (0.009 mol) of TPC was added and allowed to react at 25° C. for 12 hr, thus obtaining a polyamic acid solution having a solid content of 13 wt % and a viscosity of 815 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 112 g of a polyamide-imide copolymer in solid powder form.

The polyamide-imide solid powder was found to have an average particle size of 70 to 80 μm through particle size measurement and a weight average molecular weight of 165,000 through molecular weight measurement.

112 g of the polyamide-imide copolymer in solid powder form was dissolved in 906 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining an 11 μm thick polyamide-imide film, which was then subjected to final heat treatment at 300° C. for 10 min.

Comparative Example 1

While nitrogen was passed through a 1 L reactor equipped with a stirrer, a nitrogen injector, a dropping funnel, a temperature controller and a condenser, 701 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 19.99 g (0.045 mol) of 6FDA and 7.06 g (0.036 mol) of CBDA were added and stirred for a predetermined period of time and thus dissolved and allowed to react. The temperature of the solution was then maintained at 15° C., after which 20.10 g (0.099 mol) of TPC was added and allowed to react at 25° C. for 12 hr, thus obtaining a polyamic acid solution having a solid content of 13 wt % and a viscosity of 870 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 93 g of a polyamide-imide copolymer in solid powder form.

The polyamide-imide solid powder was found to have an average particle size of 70 to 80 μm through particle size measurement and a weight average molecular weight of 178,000 through molecular weight measurement.

93 g of the polyamide-imide copolymer in solid powder form was dissolved in 752 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining an 11 μm thick polyamide-imide film, which was then subjected to final heat treatment at 300° C. for 10 min.

Comparative Example 2

While nitrogen was passed through a 1 L reactor equipped with a stirrer, a nitrogen injector, a dropping funnel, a temperature controller and a condenser, 725 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 19.99 g (0.045 mol) of 6FDA and 10.59 g (0.036 mol) of BPDA were added and stirred for a predetermined period of time and thus dissolved and allowed to react. The temperature of the solution was then maintained at 15° C., after which 20.10 g (0.099 mol) of TPC was added and allowed to react at 25° C. for 12 hr, thus obtaining a polyamic acid solution having a solid content of 13 wt % and a viscosity of 855 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 94 g of a polyamide-imide copolymer in solid powder form.

The polyamide-imide solid powder was found to have an average particle size of 70 to 80 μm through particle size measurement and a weight average molecular weight of 170,000 through molecular weight measurement.

94 g of the polyamide-imide copolymer in solid powder form was dissolved in 760 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining a 10 μm thick polyamide-imide film, which was then subjected to final heat treatment at 300° C. for 10 min.

Comparative Example 3

While nitrogen was passed through a 1 L reactor equipped with a stirrer, a nitrogen injector, a dropping funnel, a temperature controller and a condenser, 861 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 63.97 g (0.144 mol) of 6FDA and 7.06 g (0.036 mol) of CBDA were added and stirred for a predetermined period of time and thus dissolved and allowed to react at 25° C. for 12 hr, thus obtaining a polyamic acid solution having a solid content of 13 wt % and a viscosity of 800 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 118 g of a polyamide-imide copolymer in solid powder form.

The polyamide-imide solid powder was found to have an average particle size of 70 to 80 μm through particle size measurement and a weight average molecular weight of 162,000 through molecular weight measurement.

118 g of the polyamide-imide copolymer in solid powder form was dissolved in 954 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining a 10 μm thick polyamide-imide film, which was then subjected to final heat treatment at 300° C. for 10 min.

Comparative Example 4

While nitrogen was passed through a 1 L reactor equipped with a stirrer, a nitrogen injector, a dropping funnel, a temperature controller and a condenser, 864 g of N,N-dimethylacetamide (DMAc) was added into the reactor, the temperature of the reactor was set to 25° C., 57.64 g (0.18 mol) of TFDB was dissolved, and the resultant solution was maintained at 25° C. Further, 63.97 g (0.144 mol) of 6FDA and 7.57 g (0.036 mol) of CPDA were added and stirred for a predetermined period of time and thus dissolved and allowed to react at 25° C. for 12 hr, thus obtaining a polyamic acid solution having a solid content of 13 wt % and a viscosity of 720 poise.

The polyamic acid solution was added with 34.17 g of pyridine and 44.12 g of acetic anhydride, stirred for 30 min, further stirred at 70° C. for 1 hr, cooled to room temperature, and precipitated with 20 L of methanol, after which the precipitated solid was filtered, ground and then dried at 100° C. for 6 hr in a vacuum, yielding 116 g of a polyamide-imide copolymer in solid powder form.

The polyamide-imide solid powder was found to have an average particle size of 70 to 80 μm through particle size measurement and a weight average molecular weight of 150,000 through molecular weight measurement.

116 g of the polyamide-imide copolymer in solid powder form was dissolved in 938 g of DMAc, thus obtaining an 11 wt % solution. The solution thus obtained was applied onto a stainless plate, cast to 100 μm, dried using hot air at 150° C. for 1 hr, at 200° C. for 1 hr, and at 300° C. for 30 min, and then slowly cooled, after which the resulting film was separated from the stainless plate, thus obtaining an 11 μm thick polyamide-imide film, which was then subjected to final heat treatment at 300° C. for 10 min.

<Evaluation of Properties>

(1) Transmittance

The transmittance of the film of each of Examples and Comparative Examples was measured at 550 nm using a UV spectrophotometer (CM-3700d, made by Konica Minolta).

(2) Yellow Index (Y.I.)

The yellow index was measured at 550 nm using a UV spectrophotometer (CM-3700d, made by Konica Minolta) according to ASTM E313.

(3) CTE (Coefficient of Thermal Expansion)

The CTE was measured at 50 to 300° C. using TMA (Diamond TMA, made by Perkin Elmer) through a TMA method, and the heating rate was 10° C./min and a load of 100 mN was applied.

(4) Measurement of Thickness

Five random points on the polyamide-imide film were selected, and the thickness thereof was measured using an Anritsu electronic micrometer having an error of ±0.5% or less.

(5) Birefringence

Birefringence was measured three times at 630 nm using a prism coupler (Sairon SPA4000), and the average value thereof was determined.

(6) Tensile Strength

Tensile strength was measured using 5967 made by Instron according to ASTM-D882. A test sample had a size of 13 mm×100 mm, and the tensile strength thereof was measured 7 times under conditions of a load cell of 1 KN and a tension rate of 50 mm/min, and the average value thereof, rather than the maximum value and the minimum value, was determined.

(7) Retardation

Retardation was measured using a RETS made by OTSUKA ELECTRONICS. A test sample, having a square shape with a width and length of 1 inch, was mounted to a sample holder and fixed at 550 nm using a monochromator, and Ro (in-plane retardation) was measured at an incident angle of 0° and Rth (thickness-direction retardation) was measured at an incident angle of 45°.

$$Ro=(nx-ny)*d$$

$$Rth=[(ny-nz)*d+(nx-nz)*d]/2$$

Here, nx is a refractive index in an x direction, ny is a refractive index in a y direction, nz is a refractive index in a z direction, and d is the thickness of the polyamide-imide film in units of 10 μm.

aromatic dicarbonyl compound, the aromatic dianhydride includes (i) 4,4'-hexafluoroisopropylidene diphthalic anhydride (6FDA) and (ii) at least one selected from among cyclobutanetetracarboxylic dianhydride (CBDA) and cyclopentanetetracarboxylic dianhydride (CPDA), and the aromatic diamine includes 2,2'-bis(trifluoromethyl)-1,1'-biphenyl-4,4'-diamine (TFDB).

2. The polyamide-imide resin of claim 1, wherein the aromatic dicarbonyl compound includes at least one selected from the group consisting of p-terephthaloyl chloride (TPC), terephthalic acid, iso-phthaloyl dichloride, and 4,4'-benzoyl chloride.

3. The polyamide-imide resin of claim 1, wherein the (ii) at least one selected from among the cyclobutanetetracarboxylic dianhydride (CBDA) and the cyclopentanetetracarboxylic dianhydride (CPDA) is contained in an amount of 10 to 30 mol % based on the total molar amount of the aromatic dianhydride and the aromatic dicarbonyl compound.

4. The polyamide-imide resin of claim 1, wherein the aromatic diamine further includes at least one selected from the group consisting of oxydianiline (ODA), p-phenylenediamine (pPDA), m-phenylenediamine (mPDA), bis(aminohydroxyphenyl)hexafluoropropane (DBOH), bis(aminophenoxy)benzene (133APB, 134APB, 144APB), bis(aminophenyl)hexafluoropropane (33-6F, 44-6F), bis(aminophenyl)sulfone (4DDS, 3DDS), bis[(aminophenoxy)phenyl]hexafluoropropane (4B DAF), bis[(aminophenoxy)phenyl]propane (6HMDA), and bis(aminophenoxy)diphenylsulfone (DBSDA).

5. The polyamide-imide resin of claim 1, wherein the aromatic dianhydride further includes at least one selected

TABLE 1

| | Composition | Molar ratio | Thick. (μm) | Transmit (%) | Y.I. | CTE (ppm/° C.) | Birefringence | Tensile strength (MPa) | Retardation Ro | Rth |
|---|---|---|---|---|---|---|---|---|---|---|
| Ex. 1 | TFDB/6FDA + CBDA + TPC | 100/30:20:50 | 10 | 89.9 | 3.6 | 10.9 | 0.061 | 164 | 0.24 | 297 |
| Ex. 2 | TFDB/6FDA + CBDA + TPC | 100/40:20:40 | 10 | 89.8 | 3.2 | 11.4 | 0.054 | 158 | 0.16 | 231 |
| Ex. 3 | TFDB/6FDA + CBDA + TPC | 100/60:20:20 | 11 | 89.8 | 3.0 | 11.9 | 0.047 | 150 | 0.10 | 159 (144) |
| Ex. 4 | TFDB/6FDA + CBDA + TPC | 100/75:20:5 | 11 | 90.1 | 2.9 | 12.7 | 0.021 | 131 | 0.09 | 142 (129) |
| Ex. 5 | TFDB/6FDA + CPDA + TPC | 100/30:20:50 | 11 | 88.1 | 4.5 | 10.2 | 0.074 | 170 | 0.27 | 298 (271) |
| Ex. 6 | TFDB/6FDA + CPDA + TPC | 100/40:20:40 | 12 | 88.4 | 4.2 | 10.9 | 0.061 | 164 | 0.17 | 270 (245) |
| Ex. 7 | TFDB/6FDA + CPDA + TPC | 100/60:20:20 | 10 | 88.7 | 3.7 | 11.4 | 0.052 | 154 | 0.15 | 221 |
| Ex. 8 | TFDB/6FDA + CPDA + TPC | 100/75:20:5 | 11 | 88.9 | 3.2 | 12.6 | 0.040 | 135 | 0.11 | 150 (136) |
| C. Ex. 1 | TFDB/6FDA + CBDA + TPC | 100/25:20:55 | 11 | 89.0 | 5.0 | 9.0 | 0.116 | 172 | 0.30 | 600 (545) |
| C. Ex. 2 | TFDB/6FDA + BPDA + TPC | 100/25:20:55 | 10 | 87.4 | 4.5 | 8.5 | 0.101 | 185 | 0.42 | 580 |
| C. Ex. 3 | TFDB/6FDA + CBDA | 100/80:20 | 10 | 89.8 | 4.7 | 37.3 | 0.008 | 84 | 0.16 | 123 |
| C. Ex. 4 | TFDB/6FDA + CPDA | 100/80:20 | 11 | 89.3 | 4.5 | 35.2 | 0.012 | 87 | 0.17 | 135 (122) |

As is apparent from Table 1, the polyamide-imide films of Examples 1 to 8 was colorless and transparent and exhibited low birefringence and high mechanical properties and thermal stability, compared to those of the polyamide-imide films of Comparative Examples 1 to 4.

All simple modifications or variations of the present invention may be easily performed by those skilled in the art, and may be incorporated in the scope of the present invention.

The invention claimed is:

1. A polyamide-imide resin, which is an imide of a polyamic acid resulting from copolymerizing an aromatic dianhydride and an aromatic dicarbonyl compound with an aromatic diamine, wherein the aromatic dicarbonyl compound is contained in an amount of 1 to 50 mol % based on a total molar amount of the aromatic dianhydride and the from the group consisting of biphenyltetracarboxylic dianhydride (BPDA), bicyclo[2.2.2]oct-7-ene-2,3,5,6-tetracarboxylic dianhydride (BTA), 4-(2,5-dioxotetrahydrofuran-3-yl)-1,2,3,4-tetrahydronaphthalene-1,2-dicarboxylic dianhydride (TDA), pyromellitic dianhydride, 1,2,4,5-benzenetetracarboxylic dianhydride (PMDA), benzophenone tetracarboxylic dianhydride (BTDA), bis(carboxyphenyl) dimethylsilane dianhydride (SiDA), oxydiphthalic dianhydride (ODPA), bis(dicarboxyphenoxy) diphenylsulfide dianhydride (BDSDA), sulfonyl diphthalic anhydride (SO2DPA), and (isopropylidenediphenoxy)bis(phthalic anhydride) (6HDBA).

6. A polyamide-imide film, manufactured from the polyamide-imide resin of claim 1.

7. The polyamide-imide film of claim 6, wherein the polyamide-imide film has a transmittance of 88% or more, measured at 550 nm for a film having a thickness of 8 to 12 μm, and a coefficient of thermal expansion (CTE) of 13 ppm/° C. or less, measured at 50 to 300° C. using a thermomechanical analysis method (TMA method).

8. The polyamide-imide film of claim 6, wherein the polyamide-imide film has a tensile strength of 130 MPa or more for a film having a thickness of 8 to 12 μm when measured according to ASTM D882.

9. The polyamide-imide film of claim 6, wherein the polyamide-imide film has a birefringence of 0.1 or less, an in-plane retardation (Ro) of 1 nm or less, and a thickness-direction retardation (Rth) of 300 nm or less at a thickness of 10 μm.

10. A substrate for a plastic display comprising the polyamide-imide film of claim 6.

11. A polyamide-imide film comprising the polyamide-imide resin of claim 1.

12. A substrate for a plastic display comprising the polyamide-imide film of claim 11.

\* \* \* \* \*